United States Patent [19]

Becker

[11] 4,264,546
[45] Apr. 28, 1981

[54] METHOD FOR PRODUCING SILICON NITRIDE MOLDED BODIES BY MEANS OF PSEUDOISOSTATIC HOT PRESSING

[75] Inventor: Rudolf Becker, Linkenheim, Fed. Rep. of Germany

[73] Assignee: Kernforschungszentrum Karlsruhe GmbH, Karlsruhe, Fed. Rep. of Germany

[21] Appl. No.: 21,975

[22] Filed: Mar. 19, 1979

[30] Foreign Application Priority Data

Mar. 18, 1978 [DE] Fed. Rep. of Germany ....... 2812019

[51] Int. Cl.$^3$ .......................... C04B 35/58; F27B 9/04; F27B 9/10
[52] U.S. Cl. ...................................... 264/65; 264/85; 264/86; 264/332
[58] Field of Search ....................... 264/85, 86, 65, 66, 264/332

[56] References Cited

U.S. PATENT DOCUMENTS

| | | | |
|---|---|---|---|
| 4,036,653 | 7/1977 | Jacobson | 264/65 |
| 4,112,143 | 9/1978 | Adlerborn et al. | 264/65 |
| 4,119,690 | 10/1978 | Prochazka et al. | 264/65 |
| 4,126,653 | 11/1978 | Smith et al. | 264/65 |
| 4,127,630 | 11/1978 | Washburn | 264/65 |

Primary Examiner—Donald J. Arnold
Attorney, Agent, or Firm—Spencer & Kaye

[57] ABSTRACT

Method and apparatus for producing silicon nitride molded bodies by means of a pseudoisostatic hot pressing process. Silicon nitride is initially ground in a grinding vessel with grinding elements wherein the vessel is lined with the same material from which the grinding elements are made, e.g., hot pressed silicon nitride. Grinding is continued until a specific surface area greater than 15 $m^2$ is obtained. The grinding takes place in the presence of a grinding liquid to prevent oxidation of the freshly ground silicon nitride. The silicon nitride suspension is then treated in a pressure vessel to remove the grinding liquid therefrom and form a blank. The blank is thereafter embedded within a pressure transfer medium, e.g., boron nitride, and inserted into the die of a hot pressing furnace to obtain the desired hot pressed silicon nitride.

The pressure vessel used in this method comprises a chamber for the silicon nitride suspension, an outlet means connected to the bottom of the chamber to permit the vacuum removal of the grinding fluid from said suspension; and an inlet means connected to the chamber for admitting an inert gas, e.g., nitrogen, into the chamber.

8 Claims, 4 Drawing Figures

METHOD FOR PRODUCING SILICON NITRIDE MOLDED BODIES BY MEANS OF PSEUDOISOSTATIC HOT PRESSING

BACKGROUND OF THE INVENTION

The present invention relates to a method for producing silicon nitride molded bodies by means of a pseudoisostatic hot pressing process wherein the mold of the hot pressing furnace is carbon. The present invention also relates to apparatus for practicing the method.

The ceramic substance $Si_3N_4$ has been examined for years as to its suitability as a material for fabricating high temperature combustion gas turbines. The requirements for use in such turbines include good hardness and thermal shock resistance over a temperature range from room temperature to about 1300° C.

In the manufacture of $Si_3N_4$ molded bodies, two significantly different methods can be employed. The first method relates to the nitriding of porous silicon blanks (reaction bounded silicon nitride) which results in the formation of a silicon nitride product that is a porous body, exhibiting decreased hardness, but relatively satisfactory high temperature (HT) properties. The other method relates to the hot pressure sintering of blanks made from $\alpha\text{-}Si_2N_4$ powder (i.e., hot pressed silicon nitride) which results in the formation of a product which, when the quantity of sinter-enhancing additives is sufficient, has a density corresponding to its theoretical density and thus possesses good hardness values. The high temperature properties are sometimes substantially worsened by incorporating the sintering additives, e.g., MgO, into the sintering mixture because the sintering additives do not become incorporated into the lattice structure of the $Si_3N_4$. Thus, under sintering conditions, MgO forms a liquid phase with $SiO_2$ which is always present at the surface of the $Si_3N_4$ particles, (which is the reason for the sinter-enhancing effect) and this liquid phase hardens amorphously at the grain boundaries. This vitreous phase, which contains intergranular silicate, softens at relatively low temperatures and thereby causes an undesirable high temperature plasticity of the resulting product.

Other sinter-enhancing additives, e.g., $Al_2O_3$ are incorporated to a greater or lesser degree of completeness into the $Si_3N_4$ lattice, but the resulting mixed crystal exhibits a significantly worse behavior in response to temperature changes, which at least considerably limits its intended use.

It would therefore be obvious to produce a hot pressed $Si_3N_4$ product which is at least substantially free of sinter-enhancing additives being incorporated therein. But this has not yet been possible when conventional pressing techniques are employed with graphite molds (G. R. Terwillinger, F. F. Lange, "Hot Pressing Behaviour of $Si_3N_4$", J. Am. Cer. Soc. 57 (1974) page 25–29). In such techniques, $Si_3N_4$ in the form of bulk powder or a blank is pressed monoaxially or pseudoisostatically in a graphite mold. Temperatures of 1600°–1850° C. and compression pressures of 10–35 $MN/m^2$ (Mega Newton/$m^2$) are used. The starting powder generally has a grain size of $\leqq 10$ and an impurity content of $>0.8\%$.

Another method is disclosed in German Offenlegungsschrift No. 2,536,676. According to this method, it is possible to produce $Si_3N_4$ molded bodies which are free of alloys, but which are highly dense. However, this method is very complicated to use and, thus, this process has not been developed beyond the laboratory stage.

A need therefore exists to provide a method and apparatus for practicing the method wherein hot-pressed $Si_3N_4$ bodies or preforms can be produced which are highly dense and alloy-free.

A significant object of the present invention is the provision of a method for producing hot-pressed $Si_3N_4$ bodies or preforms that are highly dense and free of alloy contamination.

Another object of the present invention is an apparatus for carrying out the methods of the present invention.

Still another object of the present invention is the production of hot-pressed $Si_3N_4$ bodies or preforms that exhibit good stability, high resistance to thermal shock, and a high temperature (HT) plasticity which is low.

A further object of the present invention is the use of pressing techniques employing a graphite vessel without any reaction taking place between said vessel and the silicon nitride.

A still further object of the present invention is the provision of a method that prevents the reaction of $Si_3N_4$ with air or the humidity of the air so that optimum hot pressing of $Si_3N_4$ can be achieved.

BRIEF SUMMARY OF THE INVENTION

Briefly, the present invention relates to a method for producing silicon nitride molded bodies by means of a pseudoisostatic hot pressing wherein carbon is used as the matrix of the hot-pressing furnace. Silicon nitride is initially ground by grinding elements in a vessel that is lined with the same material as the grinding elements to obtain a specific surface area greater that 15 $m^2$ per gram. The grinding step takes place in the presence of a grinding liquid that keeps air or the humidity of the air away from the starting material. Once the grinding step is completed, the grinding liquid is separated from the resulting filter cake. The filter cake is thereafter hot pressed in a furnace to form a molded body. Boron nitride is used as a pressure transfer agent for producing the molded body, and is located between the $Si_3N_4$ blank and the graphite walls of the mold.

Another embodiment of the present invention relates to the grinding vessel employed in the practice of this invention. The grinding vessel comprises a metal shell having a lining made of the same material as the grinding elements.

Still another embodiment of the present invention relates to a pressure vessel useful for removing the grinding liquid from the mixture of silicon nitride and grinding liquid. The pressure vessel comprises a chamber for said silicon nitride suspension, an outlet means connected to the bottom of the chamber to permit the vacuum removal of grinding fluid from said suspension; and inlet means connected to the chamber for admitting an inert gas into the suspension.

The foregoing, and other objects, features and advantages of the present invention will become apparent in light of the following detailed description of the preferred embodiments thereof as shown in the accompanying drawings:

DETAILED DESCRIPTION OF THE INVENTION

Various types of grinding liquids are useful in the practice of this invention. The grinding liquids are used in order to prevent the oxidation of the freshly broken or ground surfaces of silicon nitride during the grinding process which generally lasts for several hours. Suitable grinding liquids include organic liquids that are free of oxygen or those liquids that contain oxygen only in a bound form, e.g., by means of double bonds. Grinding liquids which are useful in the practice of the invention include acetone which is preferred and cyclohexane.

The grinding step generally takes place for a period of time sufficient to obtain an increase in the specific area of the silicon nitride from about 7 m$^2$/gram to at least 15 m$^2$/gram, which corresponds to an average grain size of clearly less than 1. The time required is usually greater than 20 hours.

The powder resulting from the grinding step is relatively fine grained (rather than being extremely coarse grained silicon nitride powder) and exhibits good pressing densities. Such fine grained silicon nitride can only be stored for future use under dry nitrogen (which is quite expensive) in order to prevent the quick hydrolization or oxidation of the silicon nitride from the humidity and oxygen in the air. Since relatively coarse grained silicon nitride is found to be more easily stored than the finely grained silicon nitride, it is desired to grind the Si$_3$N$_4$ just prior to its being hot pressed.

Figure 1:
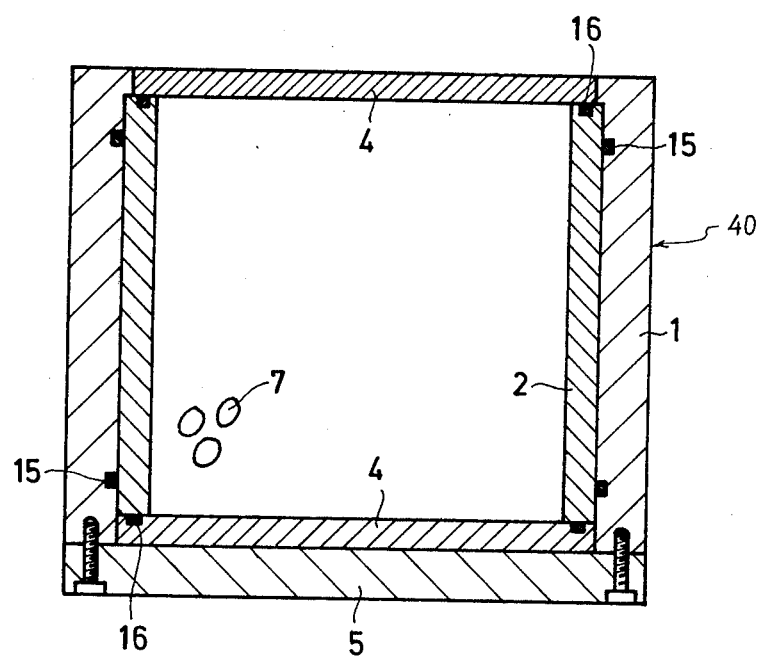
FIG. 1 is a sectional view of a grinding vessel of the present invention.

Grinding vessels of hot pressed silicon nitride are not commercially available. A particularly preferred apparatus for conducting the grinding process of the present invention is illustrated in FIG. 1. With reference to FIG. 1, a grinding vessel 40 is set forth which includes a metal shell 1 and supporting means or bottom 5. Grinding elements 7 in the form of balls are contained in vessel 40. The metal shell is lined with relatively simple molded body shapes, namely, a cylindrical tubular liner 2 and cylindrical plates 4. The lined portions 2 and 4 can be produced in the desired composition without difficulty according to conventional techniques. The liners are made of the same material as the grinding elements. According to a preferred embodiment of this invention, the liners 2 and 4 and grinding elements 7 are made of hot-pressed Si$_3$N$_4$. The metallic shell 1 and supporting means or bottom 5 can be made of aluminum. It is understood that when wear occurs liners 2 and 4 can be exchanged or replaced with new liners, which constitutes an improvement over prior art grinding vessels. Seals are produced by means of sealing rings 15 and 16.

When conventional grinding vessels or ball mills of Fe, WC—Co, Al$_2$O$_3$ or agate (SiO$_2$) are used in the grinding of Si$_3$N$_4$, a substantial contamination of the starting material results, at times, and thus prevents the production of high quality hot-pressed silicon nitride molded bodies. If the latter is contaminated, it is then necessary to wash out the contaminants, e.g., Fe, WC—Co, etc., which can be quite expensive to do. Since acids including HF, HCl, H$_2$SO$_4$ are generally used for this washing, it will naturally be expected that the activity of the powders will be substantially reduced due to the lattice deformation (hole concentration) of the upper atomic positions of the broken surfaces.

When acids are used for washing purposes, it will also be necessary to rinse out the acids with water. This rinsing procedure, however, has a deleterious effect on the powder due to the oxidation (i.e., hydrolysis) of the particle surfaces resulting in the formation of SiO$_2$ on the surface thereof. The formation of SiO$_2$ on the surface is not desired because the reduction in the activity of the powder also has an adverse effect on the sintering of the powder and the SiO$_2$ on the surface becomes a part of the intergranular vitreous phase in the finished hot pressed product that results in the said product exhibiting poor high temperature properties.

It is for this reason that the present invention, in a particularly advantageous manner, grinds the Si$_3$N$_4$ in a vessel 40, comprised of an outer shell 1, such as an aluminum shell, having liners 2 and 4 made of hot pressed silicon nitride (Si$_3$N$_4$) by using grinding elements 7 made of the same material as the liners. Thus, contamination of the silicon nitride being ground within said vessel with sinter-enhancing additives (produced from the alloy component of the liners for the grinding vessels due to the abrasion of the same) can be kept to a minimum, as desired. Moreover, it is also possible to control the amount of contaminating sinter enhancing additives to be about 0 to 1% by suitably selecting the composition of the grinding vessel liners. It is also noted that sinter enhancing additives introduced in this manner are introduced in the form of a very fine powder and in a homogeneous manner, which is almost impossible to have by conventional techniques. This provides an extremely positive influence on the quality of the hot pressed silicon nitride produced from Si$_3$N$_4$ powders comminuted in accordance with this invention.

As noted hereinbefore, during the production of ground Si$_3$N$_4$ blanks that are to be molded in accordance with this invention, it is necessary to prevent any reacting between the Si$_3$N$_4$ with air or the humidity of the air in order to achieve optimum pressability of the low impurity $\alpha$-Si$_3$N$_4$. Therefore, in practicing the present invention the powder, or the blank 8, respectively, is shielded by being maintained in contact with the grinding liquid as long as possible until the time for hot-pressing.

Figures 2, 3:
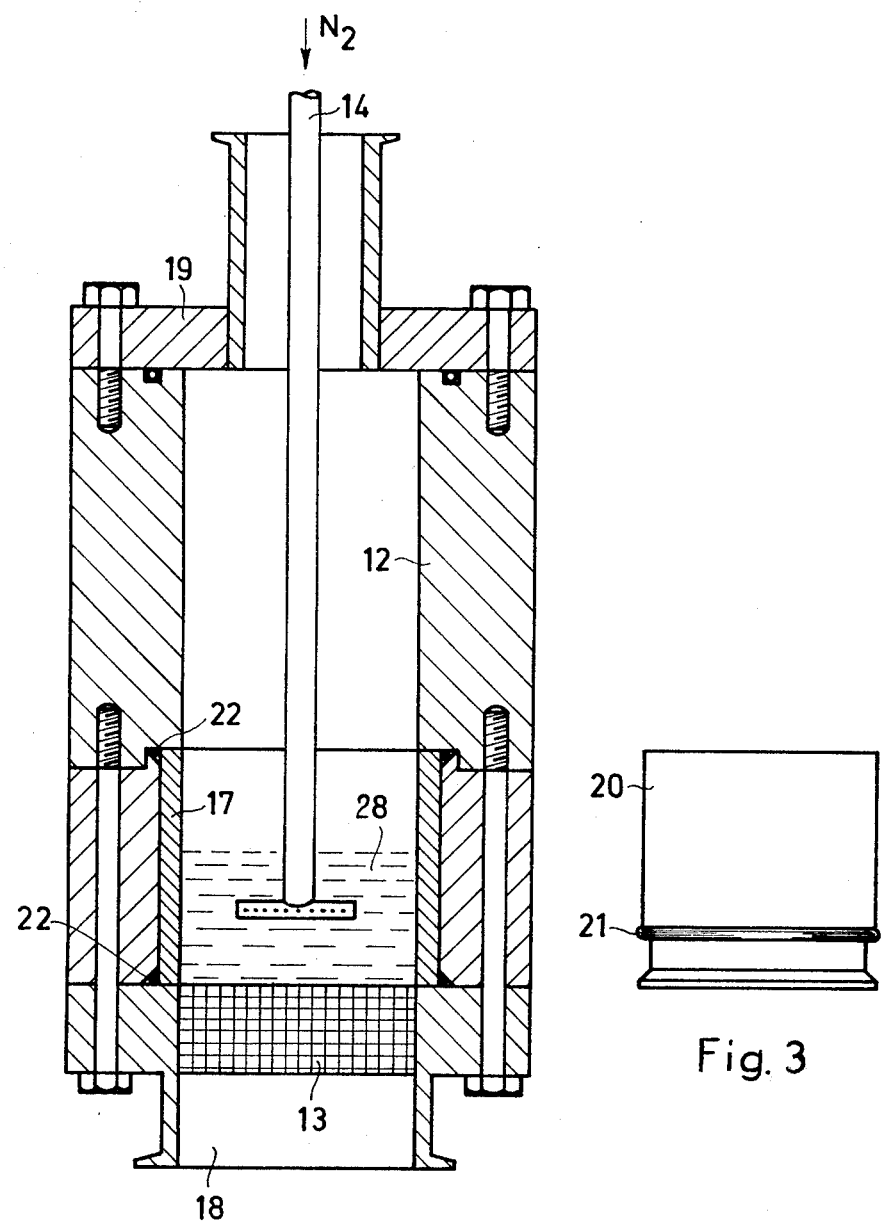
FIG. 2 is a sectional view of a pressure vessel of the present invention.
FIG. 3 illustrates a special pressure stamp used in the pressure vessel of FIG. 2.

When the ground Si$_3$N$_4$ is ready to be hot pressed, the ground Si$_3$N$_4$ and grinding liquid, which are combined in the form of a suspension, must be separated. This is achieved by feeding the suspension into pressure vessel 12 (FIG. 2) wherein vacuum pressure is used to separate the grinding liquid from ground Si$_3$N$_4$ to produce a blank or filter cake 8. According to this embodiment of the invention, it is preferred to introduce an inert gas under pressure, into the pressure vessel, to prevent the sedimentation of the Si$_3$N$_4$ within the pressure vessel.

The suspension 28 (which later become the blank 8 that is used to form the hot pressed molded product) containing the desired quantity of Si$_3$N$_4$ powder, is fed into chamber 30 in the lower portion of the pressure vessel 12, which has an upstanding hardened steel vessel or wall 17 and a sieve bottom 13. Vessel 17 is provided with seals 22 on its side. A vacuum is applied to the filter bottom (vacuum filter) of said chamber 30 by means of a liquid separator (cooling trap at flange 18; not shown in detail). The pressure vessel 12 is then closed by means of a valve cover 19. An inert gas, i.e., nitrogen, is introduced via an inlet 14 through valve cover 19, under a pressure of about 2 to 4 atmospheres.

This nitrogen is introduced into suspension 28 so that the suspension remains continuously turbulent and thereby prevents the sedimentation of the $Si_3N_4$ which can produce inhomogeneities in the blank due to excess pressure filtration. At the end of the filtration procedure, the filter cake 8 has further liquid removed therefrom and is further compacted in vessel 17 by means of a special stamp 20 having an O-ring 21 attached thereto (see FIG. 3). For this purpose, cover 19 is opened and inlet 14 has been removed.

The blank 8, thus produced, can be handled easily and, if it has previously been provided with a suitable quantity of an organic binder (injection molding) it can be shaped into shaped bodies by machining. The density of the blank, at this point, is 1.5 to 1.7 $g/cm^3$ which is about 50 to 60% of the theoretical density of $Si_3N_4$.

By means of conventional injection molding techniques, it is possible with the addition of conventional binders, to produce more complex molded bodies exhibiting an even higher density (up to about 2.5 $g/cm^3$ and corresponding to about 75% of the theoretical density).

Figure 4:
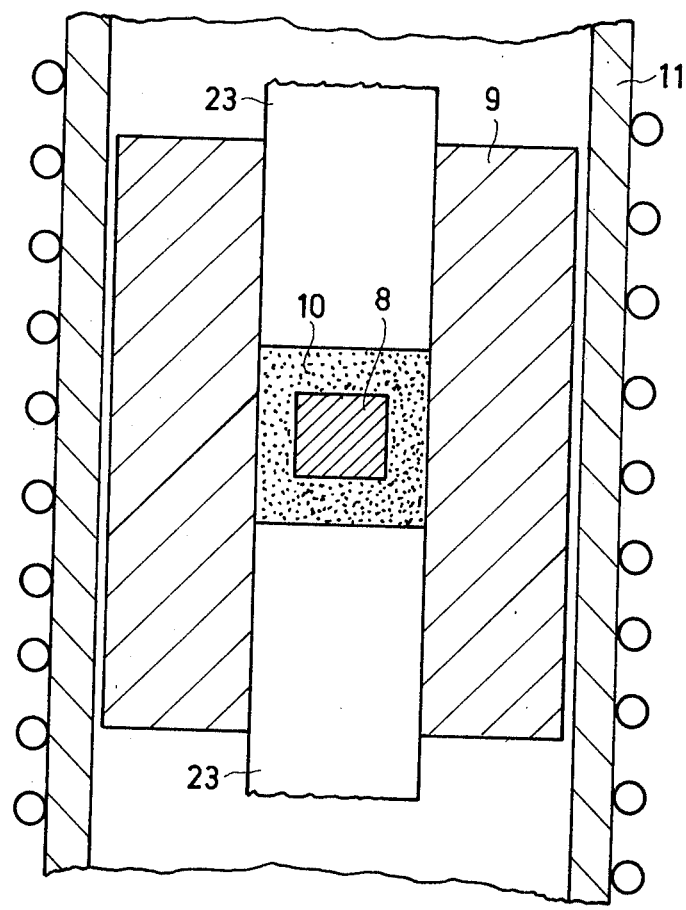
FIG. 4 is a schematic overview of a hot pressing furnace used in the practice of this invention.

The pseudoisostatic hot pressing method, which can be performed in the schematically shown hot pressing furnace 11 of FIG. 4, can produce molded bodies 8 of a shape other than cylindrical. In using furnace 11, a pressure transfer medium 10 is employed in order to prevent a reaction of this $Si_3N_4$ pressed body with the carbon or graphite of the die or pressing vessel 9, even at high temperatures. Such a reaction is not desired because the $Si_3N_4$ is converted to SiC and the resulting hot pressed body exhibits a loss of weight as a result of such contact.

Suitable pressure transfer mediums useful in the practice of this invention include: pure boron nitride, boron nitride with additions of $SiO_2$ and $SiO_2+SiO_4$. Possible is also: pure $SiO_2$ or $SiO-MpO-Si_3N_4$ mixtures. A particularly preferred pressure transfer medium is boron nitride. The preferred pressure transfer medium employed in the practice of this invention is in the form of a particulate material and such material generally has an average particle size of between 0.01 $\mu m$ and 5 $\mu m$, preferably 0.5–2.0 $\mu m$.

In practice the blank 8 is embedded in a package of BN powder 10 in a graphite pressing vessel 9 lined with a graphite foil (not shown). Pressure stamps 23 of graphite (not shown in detail) are used and the pressing vessel 9 and pressure transfer medium 10 are placed into the very hot pressing furance 11.

Then, the residual moisture or the binder are driven out of the blank 8 by heat under vacuum (T<500° C.).

The hot pressing process itself according to the present invention differs from the described prior art techniques. For example, a compression pressure up to 120 $MN/m^2$ can be used in the practice of the present invention and these pressures are clearly higher than those used in the past. Preferably, the compression pressure ranges from about 20 to 100 $MN/m^2$. The pressing cycle does not continue in stages but in a uniformly ascending manner until it reaches the maximum pressure and after reaching about 95% of the total shrinkage in size of the blank 8, it continues in a sawtooth manner (frequency approximately 0.5 Hz, amplitude about 30% of the maximum value). With this mode of operation the special requirements of pseudoisostatic hot pressing are taken under consideration.

It is important to prevent the solidification of pressure transfer medium 8 into the form of "building bridges". Should such bridges exist between vessel or die 9 and blank 8, it becomes impossible to transfer the desired pressure to said blank 8. In the event that such bridges are formed, they are caused to collapse by kneading of the pressure transfer medium 8 so that complete compression of blank 8 can be achieved.

The pressing temperatures generally is between about 1560° C. and 1950° C. and preferably between 1750° and 1850° C. Hot pressing takes place in a non-oxidizing atmosphere and in the presence of inert gas. Suitable inert gases include nitrogen, A preferred inert gas is nitrogen. In carrying out the hot pressing procedure of this invention, no weight losses of the silicon nitride bodies are encountered.

With the use of the above-described pressing technique and manner of pressing, it is possible to produce a hot-pressed silicon nitride body having an alloy content of less than 0.1% (wherein the alloy is, for example, MgO) and exhibiting a density equal to its theoretical density.

It will be understood that the above description of the present invention is susceptible to various modifications, changes and adaptations, and the same are intended to be comprehended within the meaning and range of equivalents of the appended claims.

What is claimed is:

1. A method for producing silicon nitride molded bodies by means of pseudoisostatic hot pressing wherein carbon is used as the die of the hot pressing furnace, comprising:
   (1) grinding a silicon nitride starting material to a specific surface area greater than 15 $m^2$ per gram in combination with a sufficient amount of grinding liquid in the form of a suspension to keep air and the humidity of the air away from said starting material, said grinding being done by grinding elements made of silicon nitride in a vessel lined with silicon nitride;
   (2) removing said grinding liquid from said ground silicon nitride to form a filter cake or blank; and
   (3) embedding said filter cake or blank within a pressure transfer medium within a hot pressing furnace and pseudoisostatically hot pressing the embedded blank to form a hot pressed silicon nitride molded body.

2. The method of claim 1 wherein said pressure transfer medium is boron nitride.

3. The method of claim 1 wherein said grinding liquid is an organic liquid capable of preventing the oxidation of freshly ground silicon nitride.

4. The method of claim 1, wherein said grinding liquid is acetone or cyclohexane.

5. The method of claim 1 further comprising removing said grinding liquid by means of a vacuum and introducing, under pressure, an inert gas to provide turbulence and prevent sedimentation of said silicon nitride during the removal of the grinding liquid.

6. The method of claim 5 wherein said inert gas is nitrogen.

7. The method of claim 1 wherein said vessel lining and said grinding elements are both made of hot pressed silicon nitride.

8. The method of claim 1 further comprising hot pressing said silicon nitride filter cake or blank at a temperature between 1750° and 1850° C. in the presence of an inert atmosphere.

* * * * *